US007466926B2

(12) United States Patent
Kao et al.

(10) Patent No.: US 7,466,926 B2
(45) Date of Patent: Dec. 16, 2008

(54) METHOD AND APPARATUS FOR RZ-DPSK OPTICAL SIGNAL GENERATION

(75) Inventors: Yuan-Hua Kao, Holmdel, NJ (US); Xiang Liu, Marlboro, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 470 days.

(21) Appl. No.: 10/856,729

(22) Filed: May 28, 2004

(65) Prior Publication Data

US 2005/0265733 A1 Dec. 1, 2005

(51) Int. Cl.
*H04B 10/04* (2006.01)
*H04B 10/12* (2006.01)

(52) U.S. Cl. ...................................................... 398/188
(58) Field of Classification Search .................. 398/188
See application file for complete search history.

(56) References Cited

U.S. PATENT DOCUMENTS

| | | | | | |
|---|---|---|---|---|---|
| 3,845,412 | A | * | 10/1974 | Rearwin et al. | 332/104 |
| 4,658,440 | A | * | 4/1987 | Pavio et al. | 455/324 |
| 5,282,739 | A | * | 2/1994 | Chinsky et al. | 431/51 |
| 5,610,606 | A | * | 3/1997 | Fukunaga et al. | 341/143 |
| 5,872,471 | A | * | 2/1999 | Ishibashi et al. | 327/98 |
| 5,892,858 | A | | 4/1999 | Vaziri et al. | 385/2 |
| 6,559,996 | B1 | * | 5/2003 | Miyamoto et al. | 398/183 |
| 6,587,257 | B1 | * | 7/2003 | Davies | 359/328 |
| 2003/0002112 | A1 | * | 1/2003 | Hirano et al. | 359/161 |
| 2004/0105686 | A1 | * | 6/2004 | Lee et al. | 398/188 |
| 2005/0201686 | A1 | * | 9/2005 | Cole et al. | 385/40 |
| 2006/0245763 | A1 | * | 11/2006 | Ishida et al. | 398/186 |

OTHER PUBLICATIONS

Jonas Hansryd, James van Howe, and Chris Xu. "Nonlinear crosstalk and compensation in quaternary differential-phase amplitude-shift-keying transmission". Schooll of Applied and Engineering Physics, Cornell University, Ithaca, NY 14853. Feb. 23-27, 2004. vol. 1.*
A. H. Gnauck, "40-Gb/s RZ-Differential Phase Shift Keyed Transmission", *Proc. OFC'03*, paper ThE1, 2003.
Y. H. Kao et al., "10 Gb/s Soliton Generation For ULH Transmission Using A Wideband GaAs pHemt Amplifier", *Proc. OFC'03*, paper FF6, 2003.
T. Chikama et al., "Modulation And Demodulation Techniques in optical Heterodyne PSK Transmission Systems", *Journal of Lightwave Technology*, vol. 8, No. 3, Mar. 1990, pp. 309-322.
X. Liu, "Nonlinear Effects In Phase Shift Keyed Transmission", *Proceedings OFC'04*, Paper ThM4, 2004.
X. Liu et al., "Tolerance To In-Band Coherent Crosstalk Of Differential Phase-Shift-Keyed Signal With Balanced Detection and FEC", *IEEE Photonics Technology Letters*, vol. 16, No. 4, Apr. 2004, pp. 1209-1211.

(Continued)

*Primary Examiner*—Shi K Li (57) ABSTRACT

An apparatus and method for generating chirp-free return-to-zero differential phase-shift keyed optical signals using a modulator driven by at least one 3-level return-to-zero drive signals.

25 Claims, 9 Drawing Sheets

OTHER PUBLICATIONS

J.-X. Cai et al., "RZ-DPSK Field Trial Over 13,100 km of Installed Non Slope-Matched Submarine Fibers", *OFC'04* post-deadlin paper PDP34 (2004).

C. Rasmussen et al., "DWDM 40G Transmission Over Trans-Pacific Distance (10,000 km) Using CSRZ-DPSK Enhanced FED And All-Raman Amplified 100 km UltraWave Fiber Spans", *Proc. OFC'03*, PD18, 2003.

J. Leibrich et al., "CF-RZ-DPSK For Suppression Of XPM On Dispersion-Managed Long-Haul Optical WDM Transmission On Standard Single-Mode Fiber", *IEEE Photonics Technology Letters*, vol. 14, No. 2, Feb. 2002, pp. 155-157.

S. K. Korotky et al., "High-Speed, Low Power Optical Modulator With Adjustable Chirp Parameter", *Proc. of Integrated Photonics Research Topical Meeting*, Monterey, paper TuG2 (1991).

B. Bakhshi et al., "Comparison Of CRZ, RZ and NRZ Modulation Formates In A 64×12.3 Gb/s WDM Transmission Experiment Over 9000 km", *Proc. OFC'01*, paper WF4 (2001).

R.-M. Mu et al., Dynamics Of The Chirped Return-To-Zero Modulation Format, *Journal of Lightwave Technology*, vol. 20, No. 1, Jan. 2002, pp. 47-57.

J. P. Gordon et al., "Phase Noise In Photonic Communications Systems Using Linear Amplifiers", *Optics Letters*, vol. 15, No. 23, Dec. 1, 1990, pp. 1351-1353.

Y. J. Wen et al., "RZ/CSRZ-DPSK and Chirped NRZ Signal Generation Using A Single-Stage Dual Electrode Mach-Zehnder Modulator", *IEEE Photonics Technology Letters*, vol. 16, No. 11, Nov. 2004, pp. 2466-2468.

\* cited by examiner

METHOD AND APPARATUS FOR RZ-DPSK OPTICAL SIGNAL GENERATION

CROSS-REFERENCE TO RELATED APPLICATIONS

This application relates to a co-pending application entitled "Method And Apparatus For CRZ-DPSK Optical Signal Generation", Ser. No. 10/881242, filed Jun. 30, 2004.

FIELD OF THE INVENTION

The present invention relates generally to optical communications, and more specifically to an apparatus and method for generating chirp-free return-to-zero (RZ) differential phase-shift keyed (DPSK) optical signals for transmission in optical communication systems.

BACKGROUND OF THE INVENTION

DPSK optical transmission has attracted much attention recently due to the unique advantages offered by DPSK modulation with balanced detection such as superior receiver sensitivity, high tolerance to some major nonlinear effects in high-speed transmissions, and high tolerance to coherent crosstalk.

The return-to-zero (RZ) pulse format, offering high receiver sensitivity and high immunity to inter-symbol interference, is well known to offer additional advantages over non-return-to-zero (NRZ) formats in most applications. RZ-DPSK has thus become the modulation format of choice for high-capacity, long-haul transmissions.

Existing Schemes for the generation of chirp-free RZ-DPSK signals typically require a Mach-Zehnder modulator (MZM) for pulse carving and another MZM for exact phase modulation. Such a format is discussed in A. H. Gnauck, "40-Gb/s RZ-differential phase shift keyed transmission," Optical Fiber Communication Conference 2003 (OFC'03), Paper ThE1 which is incorporated herein by reference. To reduce the complexity and cost of an RZ transmitter, RZ on-off-keyed (RZ-OOK) signals have been generated using a single MZM and a differential amplifier. Such an implementation is discussed in Y. H. Kao et al, "10 Gb/s soliton generation for ULH transmission using a wideband GaAs pHemt amplifier," OFC'03, Paper FF6, which is incorporated herein by reference. However, such an implementation cannot be used for the generation of RZ-DPSK signals because unlike an RZ-OOK signal which has two states, '0' and '1', in the optical field domain, an RZ-DPSK signal has three states, '1', '0', and '−1'. In addition, both the '1' and '−1' states need to be in an RZ format with a similar duty cycle.

Accordingly, a need still exists, for cost effective methods and apparatus for generating RZ-DPSK optical signals.

SUMMARY OF THE INVENTION

The present invention provides an apparatus and method for generating a chirp-free optical RZ-DPSK signal by using a MZM driven so as to achieve simultaneous RZ pulse formatting and DPSK data modulation.

In one embodiment a method of generating an RZ-DPSK optical signal is provided which comprises generating a 3-level RZ drive signal, and driving a modulator with the RZ drive signal to generate the RZ-DPSK optical signal.

In another embodiment an apparatus for generating RZ-DPSK optical signals is provided which comprises drive circuitry adapted to generate at least one 3-level RZ drive signal, and a modulator coupled to the drive circuitry such that the at least one 3-level RZ drive signal drives the modulator to generate RZ-DPSK optical signals.

BRIEF DESCRIPTION OF THE DRAWING

FIGS. 1 a-c are diagrams depicting embodiments of optical transmitters according to the invention;

FIGS. 3 a-c are diagrams depicting an operation principle of one embodiment of an optical transmitter according to the invention;

FIGS. 4 a-c are diagrams depicting an operation principle of another embodiment of an optical transmitter according to the invention;

FIGS. 5 a-b are respectively the received electrical eye diagrams of back-to-back transmission of an RZ-DPSK signal in accordance with an embodiment of the invention at constructive and destructive ports of a delay-line interferometer;

FIGS. 6 a-b are respectively the received electrical eye diagrams of back-to-back transmission of an NRZ-DPSK signal at constructive and destructive ports of a delay-line interferometer;

FIGS. 9 a-b are respectively the received electrical eye diagrams of RZ-DPSK transmissions with different chromatic dispersions in accordance with an embodiment of the invention;

FIGS. 11 a-b are respectively the simulated electrical eye diagrams after balanced detection of a conventional NRZ-DPSK back-to-back transmission, and an RZ-DPSK back-to-back transmission in accordance with an embodiment of the invention; and FIGS. 12 a-b are respectively the simulated electrical eye diagrams after balanced detection of a conventional NRZ-DPSK back-to-back transmission, and an RZ-DPSK back-to-back transmission in accordance with another embodiment of the invention.

DETAILED DESCRIPTION OF THE INVENTION

In preferred embodiments of the present invention methods and apparatus are provided for generating chirp-free optical RZ-DPSK signals for transmission in an optical transmission system using a modulator for simultaneous RZ pulse formatting and DPSK modulation.

Figure 1A:
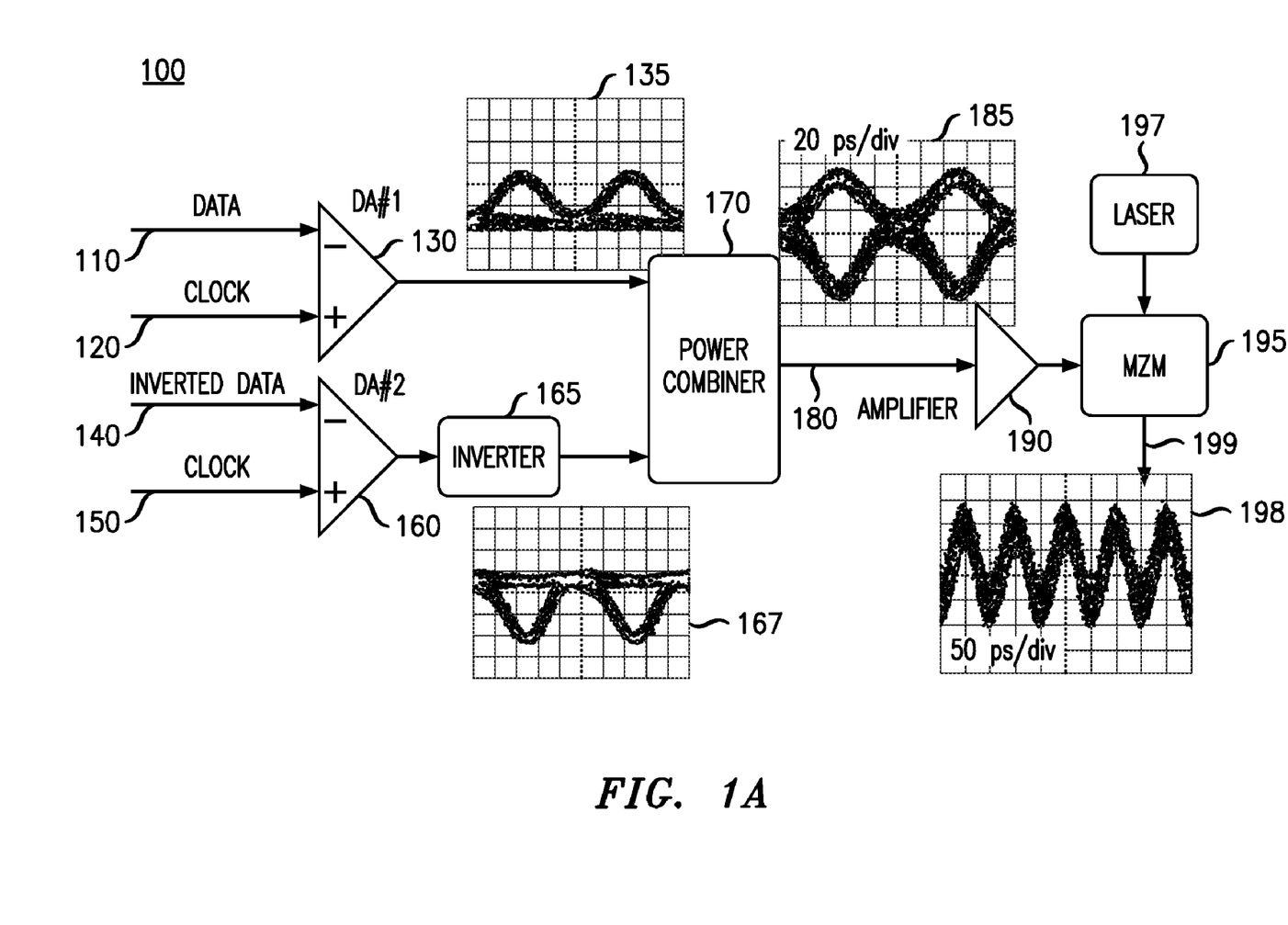

A chirp-free RZ-DPSK transmitter apparatus 100 of one embodiment of the invention is shown in FIG. 1a. As can be understood from FIG. 1a, data 110 and a sinusoidal clock signal 120 are input into a differential amplifier 130 (DA #1). The data 110 is differentially encoded and has the same data rate as the clock signal 120. The DA #1 130 operates as a comparator to produce a "2-level" electronic RZ formatted data signal. Those skilled in the art can appreciate that the data signal and the clock signal are logically combined (e.g. by a logic AND operation) to produce a signal that represents the original data as a positive electronic RZ pulse for each "1", and zero for each "0" (or vice versa). Here the RZ refers to having zero intensity or power between adjacent bits.

As used herein "2-level" signal refers to signals having two distinct states (or voltages) at two temporal locations, one at the center of each information bit, and the other between adjacent bits.

The inverse of the data signal 110 (inverted data signal 140) and another clock signal (or a copy of the clock signal 120) are input into a second differential amplifier 160 (DA #2) to generate a second 2-level signal in a similar manner as discussed above with regard to DA #1.

Alternatively, the DAs 130, 160 shown in FIG. 1a can be replaced by, for example, high-speed logic AND gates (not shown), and the driving speed may be scaled, for example, up to 40-Gb/s.

The output of DA #2 160 is then inverted by an inverter 165 before being synchronously combined using a power combiner 170 with the output of DA #1 130 to produce a "3-level" drive signal 180. The eye diagram of the inverted output of DA #2 160 is represented in the plot 167. Those skilled in the art can appreciate that the inverted output signal of DA #2 160 represents the original data as a negative electronic RZ pulse for each "0", and zero for each "1" (or vice versa). Further, those skilled in the art can appreciate that retiming circuits may be employed to ensure the needed synchronicity of the signals discussed herein (e.g. between data signal 110 and clock signal 120, between the inverted data signal 140 and the clock signal 150, and between the output of DA #1 and the inverted output of DA #2, etc.) As used herein "3-level" refers to the three states (or voltages) of the generated RF drive signal such that there are two states +1, −1 (normalized) at the center of each information bit, and a third state 0 between adjacent bits. It should be noted that the two states +1, −1 will be used to generate, through a modulator (discussed below), the two optical phase states separated by π in the RZ-DPSK signal. The 0 state will be used to realize the RZ pulse shaping in the generated RZ-DPSK signal.

Those skilled in the art can appreciate that the inversion performed by the inverter 165 may be performed by the DA #2 160 internally (i.e. with a DA having two complementary outputs).

The combined 3-level drive signal 180 represents the original data signal 110 as a positive electronic RZ pulse for each "1", and a negative electronic RZ pulse for each "0" (or vice versa). The eye diagram for the 3-level signal is shown in the plot 185 of FIG. 1a.

The drive signal 180 is preferably amplified by amplifier 190 to have a peak-to-peak magnitude of ~10V before driving a modulator 195. As shown in FIG. 1a, the modulator 195 is preferably a Mach-Zehnder modulator. More preferably, the modulator 195 is a single-drive x-cut (chirp-free) LiNbO$_3$ MZM (with V$_\pi$~6 V) biased at null.

The laser source 197 may comprise, for example, a tunable CW laser operating at 1550 nm.

Figure 1B:
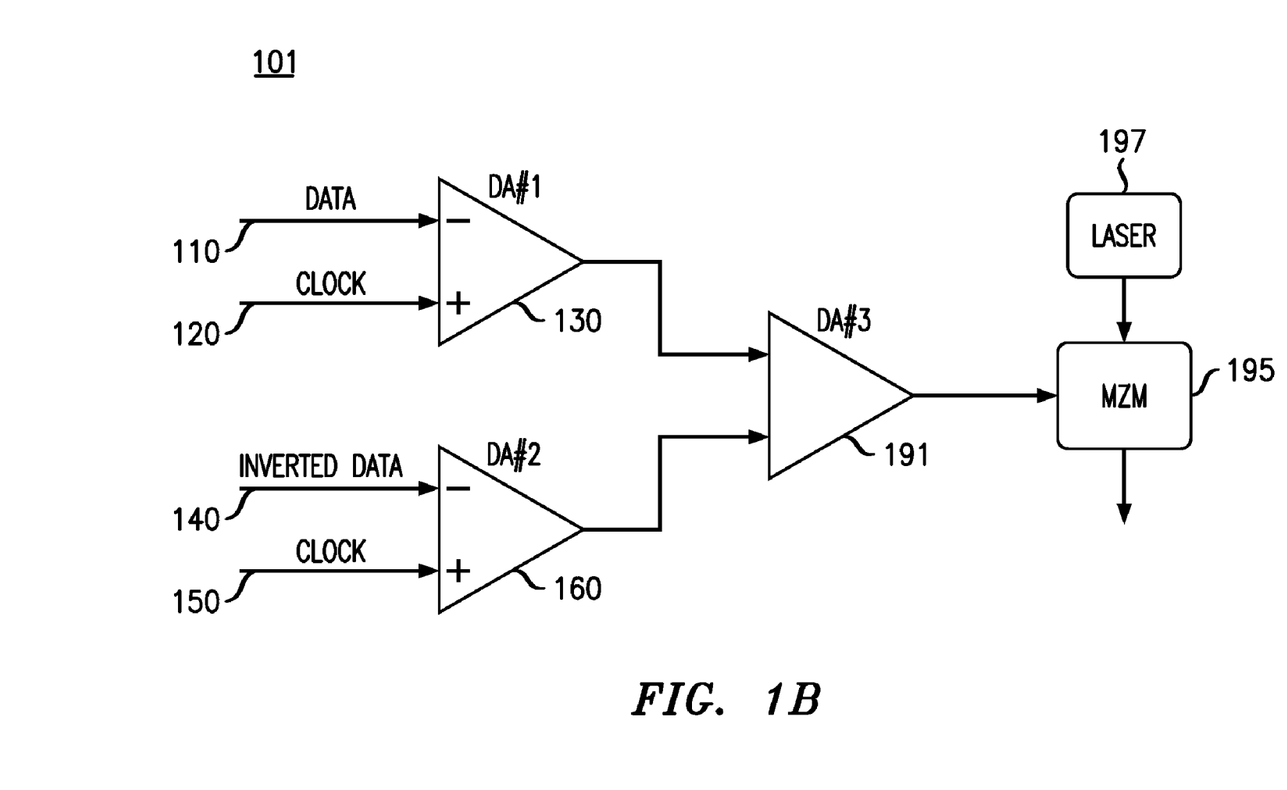

It can be understood by those skilled in the art that the inverter 165, the power combiner 170, and the amplifier 190 can be effectively replaced by a single differential amplifier 191, as shown in FIG. 1b. The differential amplifier 191 amplifies the difference between the outputs from DA #1 130 and DA #2 160. The amplified "3-level" signal is then used to drive the modulator 195 to modulate the light transmitted by the laser 197.

Figure 1C:
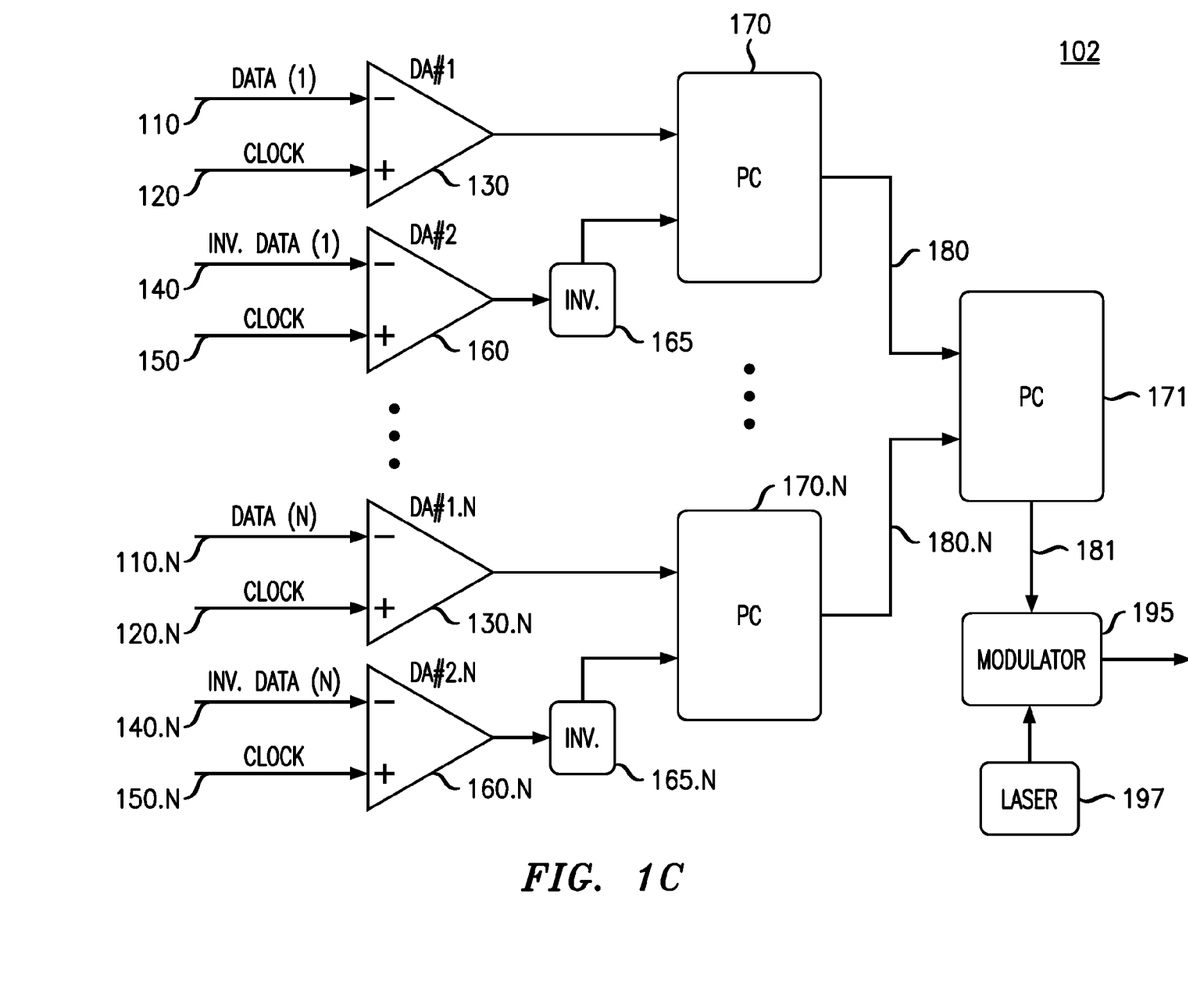

As can be understood from FIG. 1c the RZ-DPSK transmitter apparatus 100 of FIG. 1a can be modified to generate M-ary differential-phase amplitude-shift-keyed (DP-ASK) signals. As shown in FIG. 1c, data signals 110 ... 110.N and a sinusoidal clock signals 120 ... 120.N are input into differential amplifiers 130 ... 130.N (DA #1 ... DA #1.N). The data 110 ... 110.N is differentially encoded and has the same data rate as the clock signals 120 ... 120.N. DA #1 ... DA #1.N 130 ... 130.N operate as comparators to produce multiple "2-level" electronic RZ formatted data signals.

The inverse of the data signals 110 ... 110.N (inverted data signals 140 ... 140.N) and another clock signal or a copy of the clock signals 120 ... 120.N discussed above are input into second differential amplifiers 160 ... 160.N (DA #2 ... DA #2.N) to generate a plurality of second 2-level signals in a similar manner as discussed above with regard to DA #1 ... DA#2.N.

Alternatively, the DAs shown in FIG. 1c can be replaced by, for example, high-speed logic AND gates (not shown), and the driving speed may be scaled, for example, up to 40-Gb/s.

The outputs of DA #2 ... DA #2.N 160 ... 160.N are then inverted by inverters 165 ... 165.N before being synchronously combined using power combiners 170 ... 170.N with the outputs of DA #1 ... DA #1.n 130 ... 130.N to produce a plurality of "3-level" drive signals 180 ... 180.N, respectively.

The plurality of 3-level drive signals 180 ... 180.N are power combined using a power combiner 171 to produce a multi-level drive signal 181. The combined multi-level drive signal 181 represents the original data signals 110 ... 110.N as positive or negative electronic RZ pulses for "1", "0" or combinations thereof.

The drive signal 181 may be amplified by an amplifier (not shown) to have a peak-to-peak magnitude of ~10 V before driving a modulator 195. The modulator 195 is preferably a Mach-Zehnder modulator. More preferably, the modulator 195 is a single-drive x-cut (chirp-free) LiNbO$_3$ MZM (with V$_\pi$~6 V) biased at null.

The laser source 197 may comprise, for example, a tunable CW laser operating at 1550 nm.

It can be understood by those skilled in the art that the inverters 165 ... 165.N, the power combiners 170 ... 170.N, and any amplifier (not shown) can be effectively replaced by a single differential amplifier as discussed above with reference to FIG. 1b.

Figure 2:
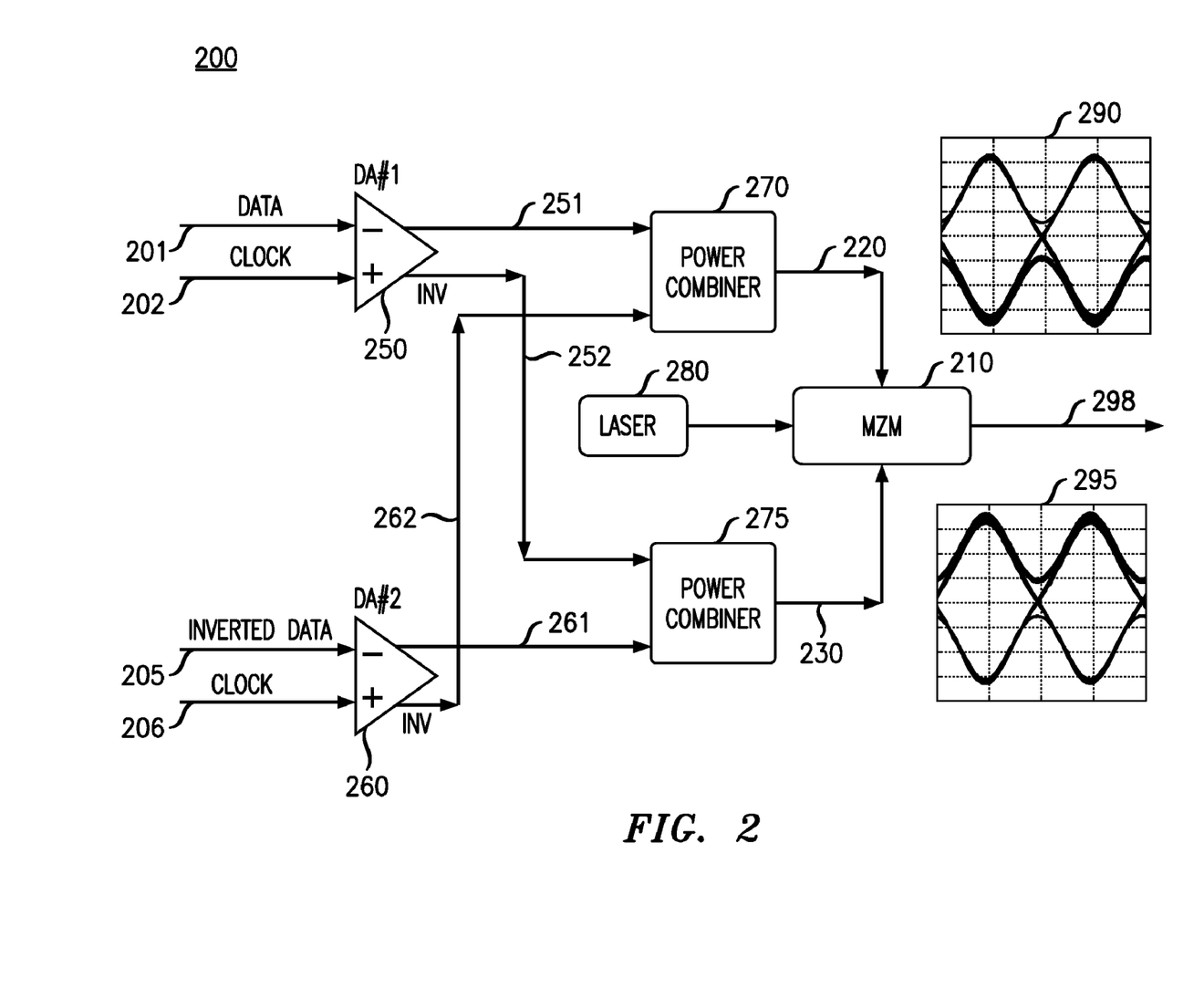
FIG. 2 is a diagram depicting another embodiment of an optical transmitter according to the invention.

A chirp-free RZ-DPSK transmitter 200 of another embodiment of the invention is illustrated in FIG. 2. As can be understood from FIG. 2, data 201 and a sinusoidal clock signal 202 are input into a differential amplifier 250 (DA #1). The data 201 is differentially encoded and has the same data rate as the clock signal 202. As with the transmitter of FIG. 1a discussed above, the DA#1 250 operates as a comparator to produce electronic RZ formatted data (251).

The inverse of the data signal 201 (inverted data signal 205) and another clock signal (or a copy of clock signal 202) 206 are input into a second differential amplifier 261 (DA #2).

Alternatively, the DAs 250, 261 shown in FIG. 2 can be replaced by, for example, high-speed logic AND gates (not shown), and the driving speed may be scaled, for example, up to 40-Gb/s.

The output of DA #1 and the inverted output of DA #2 (inverted data signal 262) are input into a power combiner 270 to produce a first "3-level" drive signal 220.

The output of DA #2 261 is then combined using a power combiner 275 with the inverted output of DA #1 (inverted data signal 252) to produce a second "3-level" drive signal 230.

The first and second drive signals 220, 230 respectively represents data signals 201 and 205 as a positive electronic RZ pulse for each "1" in the data, and a negative electronic RZ pulse for each "0" (or vice versa).

The first and second 3-level drive signals 220, 230 are used to drive a modulator 210. Eye diagrams 290 and 295 show the 3-level drive signals 220, 230. As can be understood from the plots, 290 295 the drive signals 220 230 are complementary.

The modulator 210 is preferably a dual-drive z-cut LiNbO$_3$ MZM, and is driven synchronously by the first and second 3-level drive signals 220, 230. The modulator 210 is preferably biased at null.

The laser source 280 may comprise, for example, a tunable CW laser operating at 1550 nm.

Additionally, those skilled in the art can appreciate that RF amplifiers (not shown) may be used to amplify the 3-level drive signals 220, 230 prior to driving the modulator 210.

As discussed above with reference to FIG. 1B, the transmitter 200 may be modified to use differential amplifiers in place of the power combiners 270, 275 and the optional amplifiers (not shown) to generate the first and second 3-level drive signals 220, 230. In such a configuration the outputs of DA #2 261 and 262 need to be swapped.

Figure 3:
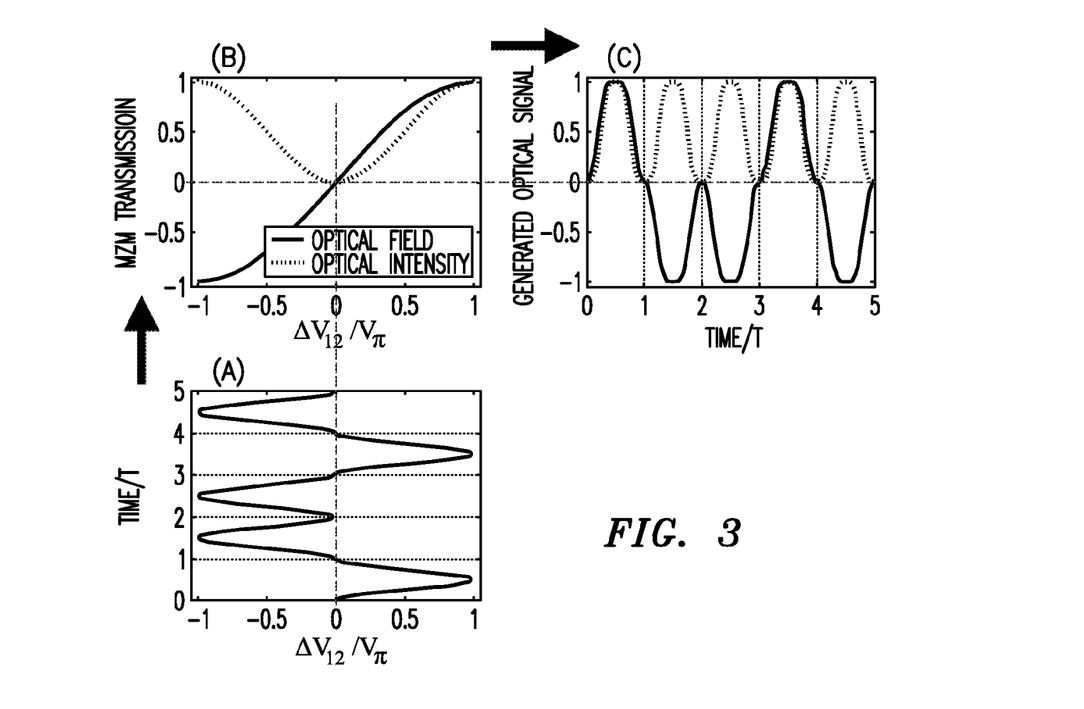

FIGS. 3 a-c show an operation principle of embodiments of a transmitter according to the invention when the MZM is fully driven. Subplots (a), (b), and (c) respectively show an electronic drive signal, the response function of the MZM, and the generated optical signal. $\Delta V_{12}$ is the voltage difference between the two driving signals for the two arms of the MZM.

For apparatus having a single-drive x-cut MZM (e.g. as discussed with reference to FIGS. 1a-c) which has an internal push-pull design, the effective driving voltages applied on to the two MZM arms are opposite to each other and have a voltage swing which is half of that of the single input driving signal. The electro-optic transfer function of the MZM (biased at null) can be described as follows. The combined optical field at the output of the MZM can be expressed as $$E_{output}(t) = E_{input}(t) \cdot (e^{i\pi v1(t)/v_\pi} - e^{i\pi v2(t)/v_\pi})/2, \quad (1)$$

where v1(t) and v2(t) are the time-varying applied voltages on the two arms of the MZM, and $v_\pi$ is the voltage needed to introduce (through the electro-optical effect) an optical phase change of π on the optical wave passing through one arm of the MZM ($v_\pi$ is generally frequency dependent, and here we use it as a constant for simplicity) v2(t)=−v1(t), so the output optical field can be simplified to $$E_{output}(t) = E_{input}(t) \cdot \sin\left(\pi \frac{\Delta v_{12}}{2v_\pi}\right), \quad (2)$$

where $\Delta v_{12}(t)$ is the voltage difference between the two arms of the MZM. The optical intensity transfer function is $$\left|\frac{E_{output}(t)}{E_{input}(t)}\right|^2 = \sin^2\left(\pi \frac{\Delta v_{12}(t)}{2v_\pi}\right). \quad (3)$$

The optical phase across each bit is always identical (either 0 or π), so the generated RZ-DPSK signal is intrinsically chirp-free (or there is no phase variation across each bit period). As shown in FIG. 3, the differentially encoded data sequence is (10010), and the generated optical signal has a phase pattern of (0ππ0π)

Figure 4:
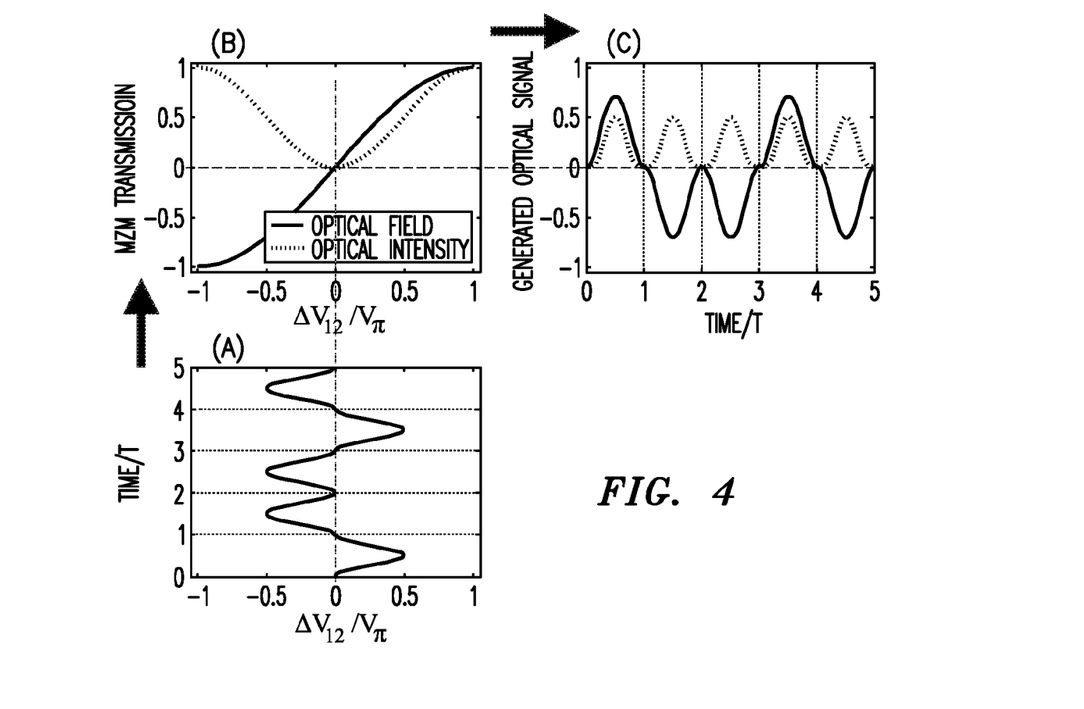

FIG. 4 shows an operation principle of embodiments of a transmitter according to the invention when the MZM is not fully driven. Subplots (a), (b), and (c) respectively show the electronic driving signal, the response function of the MZM, and the generated optical signal. The differentially encoded data sequence is (10010) and the generated optical signal has a phase pattern of (0ππ0π). There is no chirp (or phase variation) across each bit period.

Figure 5A:
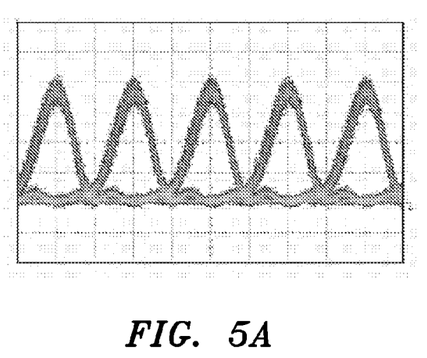
Figure 5B:
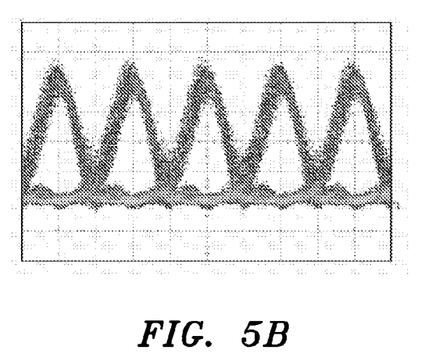

Experimental testing was conducted to confirm the performance of embodiments of the present invention. A 10 Gb/s RZ-DPSK signal generated in accordance with an embodiment of the present invention was filtered by an optical band-pass filters with ~0.6 nm 3-dB bandwidth. The signal was then de-modulated by a 100-ps delay-line interferometer (DLI). The de-modulated signals from the constructive and destructive ports of the DLI were measured. FIGS. 5 a-b are respectively the received electrical eye diagrams at the constructive and destructive ports of the DLI. As can be seen in FIGS. 5 a-b the eyes have a regular RZ pattern with small pattern dependence.

Figure 6A:
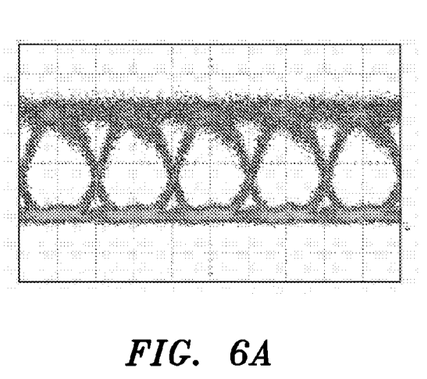
Figure 6B:
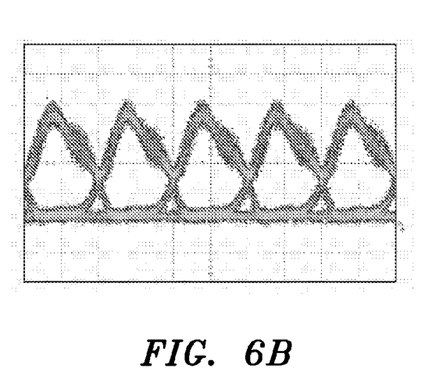

As a comparison, the experiment was repeated for conventional NRZ-DPSK. FIGS. 6 a-b are respectively the received electrical eye diagrams of a 10 Gb/s NRZ-DPSK signal at the constructive and destructive ports of the DLI. It can be appreciated by those skilled in the art that the NRZ-DPSK eyes have a noticeable pattern dependence.

Figure 7:
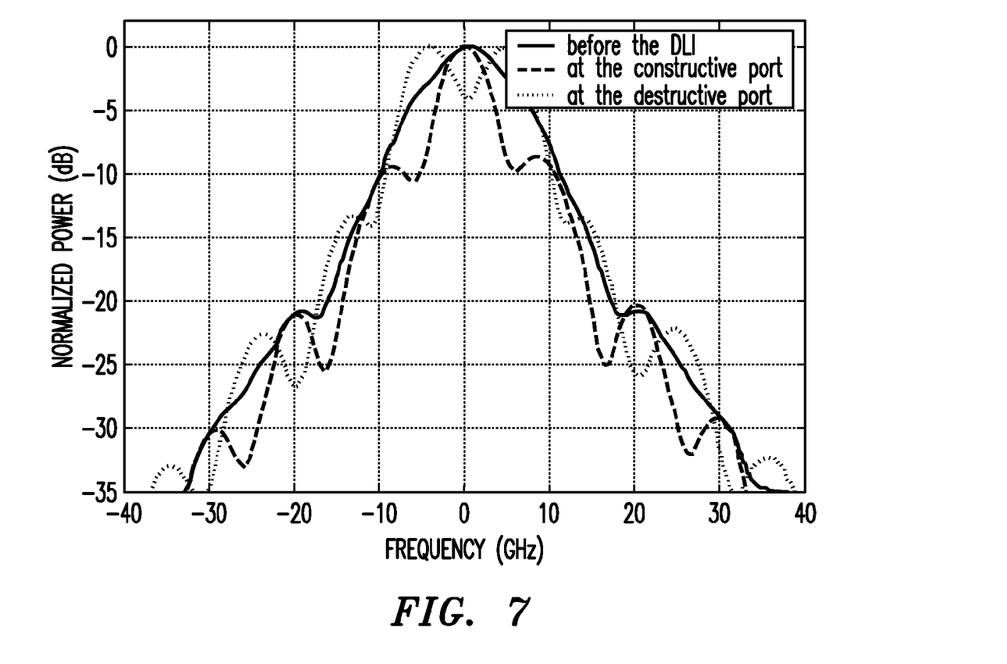
FIG. 7 is the measured optical spectra of an RZ-DPSK signal generated in accordance with an embodiment of the invention.

FIG. 7 is the measured optical spectra of a 10 Gb/s RZ-DPSK signal generated with apparatus according to an embodiment of the present invention discussed with reference to FIG. 1a. The measured spectra are similar to those conventionally obtained by using two MZMs.

Figure 8:
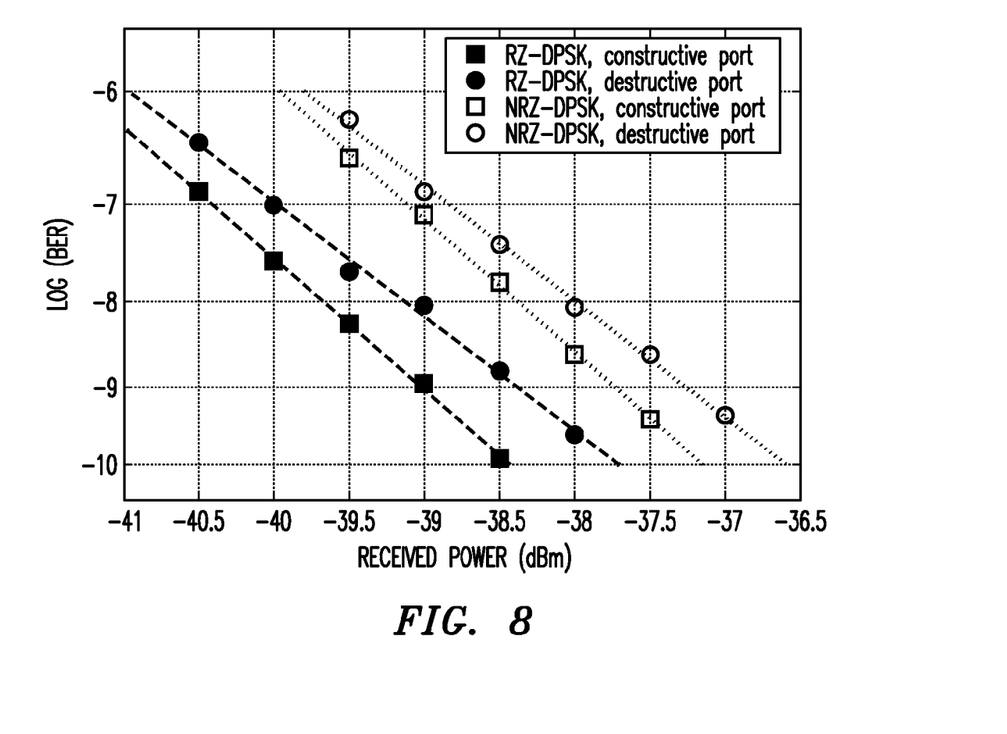
FIG. 8 is a plot showing the measured BER performance of an NRZ-DPSK transmission system and an RZ-DPSK transmission system according to an embodiment of the invention.

To further assess the performance of RZ-DPSK signals generated in accordance with embodiments of the present invention the bit-error-rate (BER) was measured for RZ and NRZ DPSK signals. FIG. 8 illustrates the measured BER dependence on the received optical power (before an optically pre-amplified DPSK receiver). As can be understood from FIG. 8, RZ-DPSK shows ~1.2 dB better receiver sensitivity at BER=10$^{-9}$ as compared to NRZ-DPSK.

Figure 9A:
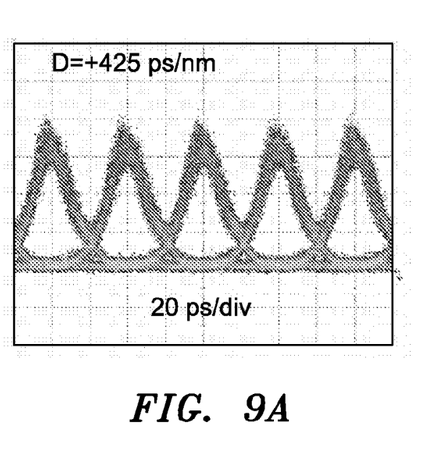
Figure 9B:
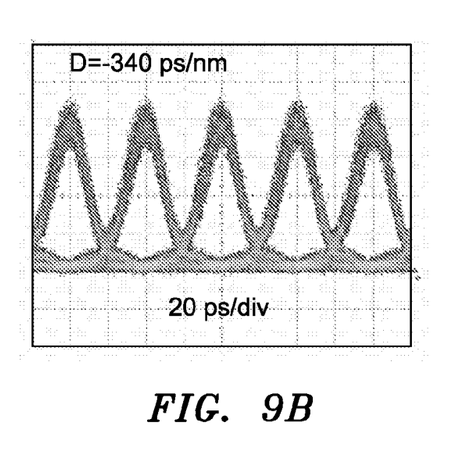

To verify the chirp-free nature of RZ-DPSK signals generated in accordance with the present invention additional measurements were performed. FIGS. 9 a-b respectively show the received electrical eye diagrams (measured at the constructive port of the delay-line interferometer) of RZ-DPSK transmissions with different chromatic dispersions (D=+425 ps/nm and −340 ps/nm). As can be understood from FIGS. 9 a-b, the eye distortions are small and similar for both dispersions (with opposite signs), and the distortion for the larger dispersion value (D=+425 ps/nm) is slightly larger, confirming the chirp-free nature of the generated RZ-DPSK signals.

Some of the potential advantages of RZ-DPSK transmitters according to the invention include cost-effectiveness, a compact design, lower power consumption and lower loss than conventional RZ-DPSK transmitters using two MZMs. Further, transmitters according to the invention provide better performance when the MZM bandwidth is limited, particularly when the modulator is under-driven.

Figure 10:
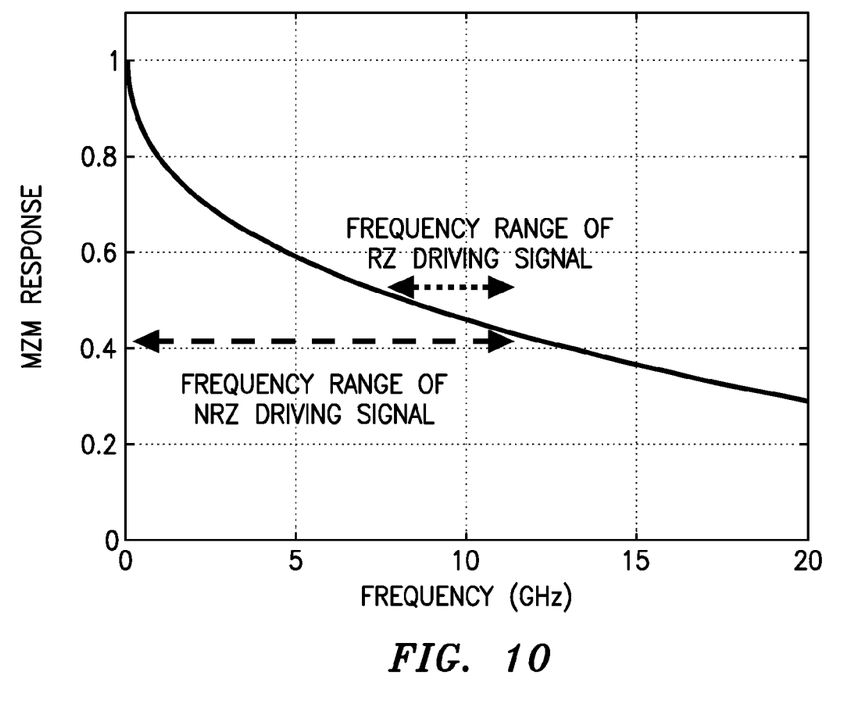
FIG. 10 is a diagram depicting the typical response of a 10-Gb/s MZM with a 3-dB electronic bandwidth of ~10 GHz.

FIG. 10 shows a typical response of a 10-Gb/s MZM. As shown in FIG. 10, there is a quick response fall-off at low frequencies (due to the electronic loss of the electrodes in the MZM), and a gradual response fall-off at high frequencies (due to the group-velocity mismatch between the electronic driving signal and the optical wave). In conventional RZ-DPSK transmitters having two MZMs, one of the two MZMs is used for NRZ-DPSK modulation. Since the frequency range of the NRZ driving signal spans from ~0 to BR (BR is the bit rate of the signal), the generated optical signal has large variation in amplitude (at the center of each bit slot where decision is made) due to the large frequency dependence of the MZM response.

Using embodiments of the present invention, driving signals are RZ formatted and their frequency range is narrowly located around the BR. Consequently, the generated optical signal has much smaller variation in amplitude at the center of each bit, resulting in better BER performance. Additionally, MZMs for use with the present invention can be designed to be narrow-banded to reduce driving voltage and cost, especially at high bit rates (e.g. 40 Gb/s).

Figure 11A:
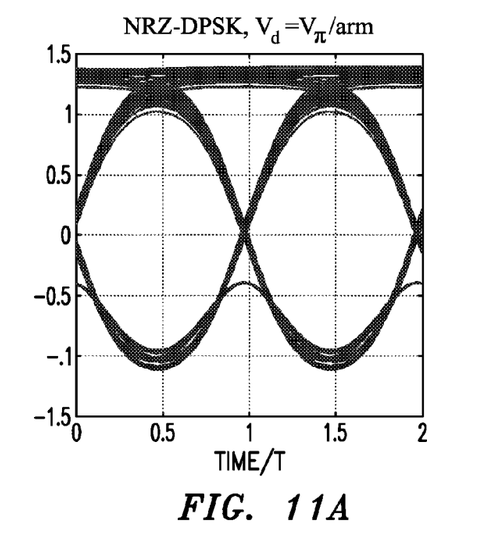
Figure 11B:
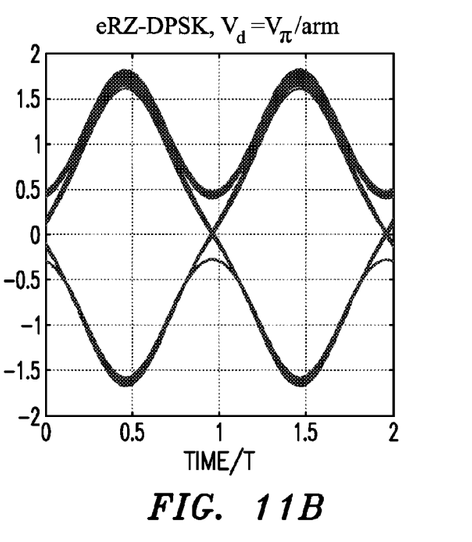

FIGS. 11a-b show respectively simulated electrical eye diagrams (after balanced detection, assuming the modulator has a limited bandwidth as shown in FIG. 10 and is fully driven ($V_d=V_\pi$/arm)), of a conventional NRZ-DPSK back-to-back transmission, and an RZ-DPSK back-to-back transmission in accordance with an embodiment of the invention. As can be seen in FIGS. 11 a-b, the amplitude fluctuation in the NRZ-DPSK eye is much larger than that in the RZ-DPSK eye. In conventional RZ-DPSK transmitters, the RZ pulse formatting by a second MZM cannot reduce the amplitude fluctuation caused by the NRZ-DPSK modulation. Accordingly, RZ-DPSK transmitters according to the present invention also outperform (in terms of having less amplitude fluctuation) any conventional RZ-DPSK transmitters.

Figure 12A:
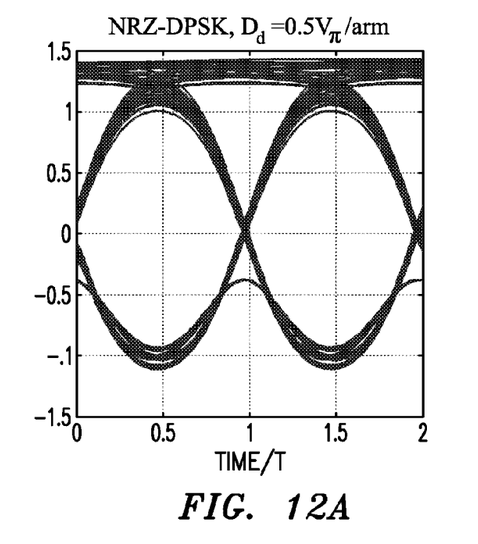
Figure 12B:
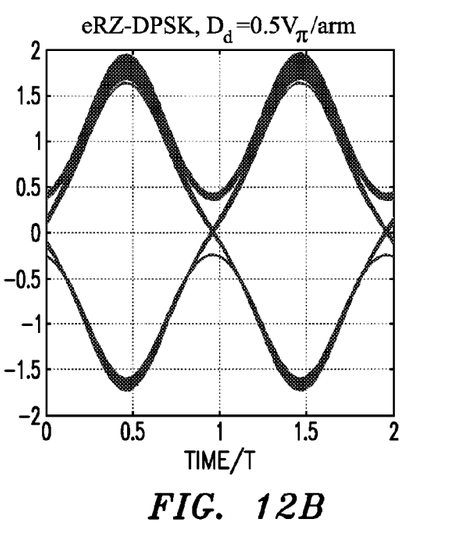

Further, the transmitters according to the present invention outperform conventional transmitters with regard to the MZM bandwidth limitation-induced amplitude fluctuation when the MZM is not fully driven. FIGS. 12 a-b respectively show the simulated electrical eye diagrams (after balanced detection, assuming the modulator has a limited bandwidth as shown in FIG. 10 and is not fully driven ($V_d=0.5V_\pi$/arm)), of a conventional NRZ-DPSK back-to-back transmission, and a RZ-DPSK back-to-back transmission in accordance with an embodiment of the invention. It can be understood from FIGS. 12 a-b, that there is larger amplitude fluctuation in the NRZ-DPSK eye than in the RZ-DPSK eye obtained using a transmitter according to the present invention.

Although the invention has been described with reference to illustrative embodiments, this description should not be construed in a limiting sense. Various modifications of the described embodiments, as well as other embodiments of the invention, which are apparent to persons skilled in the art to which the invention pertains, are deemed to lie within the principle and scope of the invention as expressed in the following claims.

We claim:

1. A method of generating a return-to-zero (RZ) differential phase-shift-keyed (DPSK) optical signal comprising the steps of:
    generating a 3-level RZ drive signal; and
    driving a modulator with the 3-level RZ drive signal to generate the RZ-DPSK optical signal, wherein the step of generating the 3-level RZ drive signal includes the steps of:
        performing a logic AND operation on a differentially encoded data signal and a clock signal to generate a first 2-level drive signal, wherein the differentially encoded data signal is a binary signal having first and second binary states;
        performing a logic AND operation on an inverse of the differentially encoded data signal and the clock signal to generate a second 2-level drive signal; and
        differentially amplifying the first and second 2-level drive signals to generate the 3-level RZ drive signal, wherein each occurrence of a binary state in the differentially encoded data signal is represented in the 3-level RZ drive signal by a positive pulse or a negative pulse relative to a reference level.

2. The method of claim 1 wherein the modulator is a single Mach-Zehnder modulator.

3. The method of claim 1 wherein driving the modulator with the RZ drive signal provides simultaneous RZ pulse formatting and DPSK modulation.

4. The method of claim 1 wherein the generated RZ-DPSK signal is chirp-free.

5. The method of claim 1 further comprising amplifying the 3-level RZ drive signal.

6. The method of claim 1, wherein the modulator is a Z-cut LiNbO$_3$ Mach-Zehnder modulator.

7. The method of claim 1, wherein said reference level is a level of the RZ drive signal at which the modulator outputs substantially no light.

8. A method for generating return-to-zero (RZ) differential phase-shift-keyed (DPSK) optical signals comprising the steps of:
    performing a logic AND operation on a differentially encoded data signal and a clock signal to generate a first 2-level drive signal, wherein the differentially encoded data signal is a binary signal having first and second binary states,
    performing a logic AND operation on an inverse of the differentially encoded data signal and the clock signal to generate a second 2-level drive signal,
    differentially amplifying the first 2-level drive signal with the second 2-level drive signal to generate a first 3-level RZ drive signal;
    differentially amplifying the inverse of the first 2-level RZ drive signals to generate the RZ-DPSK optical signals, wherein, for at least one of the first and second 3-level RZ drive signals each occurrence of a binary state in the differentially encoded data signal is represented in the 3level RZ drive signal by a positive pulse or a negative pulse relative to a reference level.

9. The method of claim 8, wherein said reference level is a level of the RZ drive signal at which the modulator outputs substantially no light.

10. A method of generating a return-to-zero (RZ) M-ary differential-phase amplitude-shift-keyed (DP-ASK) optical signal, comprising the steps of:
    generating an M-level RZ drive signal, wherein M is an integer greater than three; and
    driving a modulator with the M-level RZ drive signal, wherein the modulator modulates both intensity and phase of an optical beam to generate the RZ M-ary DP-ASK optical signal, wherein the step of generating the M-level RZ drive signal includes the steps of:
        performing a logic AND operation on a plurality of differentially encoded data signals and a clock signal to generate a plurality of first 2-level drive signals,
        performing a logic AND operation on an inverse of the plurality of differentially encoded data signals and the clock signal to generate a plurality of second 2-level drive signals,
        power combining each first 2-level drive signal with an inverse of the corresponding second 2-level drive signal to generate each of a plurality of 3-level RZ drive signals; and
        power combining the plurality of 3-level RZ drive signals to generate the M-level RZ drive signal.

11. The method of claim 10 wherein the modulator is a single Mach-Zehnder modulator.

12. An apparatus for generating an RZ-DPSK optical signal, comprising:
- drive circuitry adapted to generate at least one 3-level RZ drive signal; and
- a modulator coupled to the drive circuitry such that the at least one 3-level RZ drive signal drives the modulator to generate the RZ-DPSK optical signal, wherein the drive circuitry comprises:
  - a first logic AND gate adapted to perform a logic AND operation on a differentially encoded data signal and a clock signal to generate a first 2-level drive signal, wherein the differentially encoded data signal is a binary signal having first and second binary states;
  - a second logic AND gate adapted to perform a logic AND operation on an inverse of the differentially encoded data signal and the clock signal to generate a second 2-level drive signal, and
  - a differential amplifier adapted to differentially amplify the first and second 2-level drive signals to generate the 3-level RZ drive signal, wherein each occurrence of a binary state in the differentially encoded data signal is represented in the 3-level RZ drive signal by a positive pulse or a negative pulse relative to a reference level.

13. The apparatus of claim 12 wherein the modulator is a single single-drive Mach-Zehnder modulator.

14. The apparatus of claim 13 wherein the single-drive Mach-Zehnder modulator is an X-cut $LiNbO_3$ modulator.

15. The apparatus of claim 13 wherein the single-drive Mach-Zehnder modulator is a semiconductor-based modulator.

16. The apparatus of claim 12 wherein the modulator is a single dual-drive Mach-Zehnder modulator.

17. The apparatus of claim 16 wherein the modulator is coupled to the drive circuitry such that two complementary 3-level RZ drive signals drive the modulator to generate the RZ-DPSK optical signals.

18. The apparatus of claim 16 wherein the dual-drive Mach-Zehnder modulator is a Z-cut $LiNbO_3$ modulator.

19. The apparatus of claim 16 wherein the dual-drive Mach-Zehnder modulator is a semiconductor-based modulator.

20. The apparatus of claim 12, wherein said reference level is a level of the RZ drive signal at which the modulator outputs substantially no light.

21. An apparatus for generating RZ-DPSK optical signals comprising:
- a first differential amplifier adapted to receive a differentially encoded data signal and a clock signal and generate a first 2-level drive signal, wherein the differentially encoded data signal is a binary signal having first and second binary states;
- a second differential amplifier adapted to receive an inverse of the differentially encoded data signal and the clock signal and generate a second 2-level drive signal;
- an inverter for inverting the second 2-level drive signal;
- a third differential amplifier adapted to receive the first 2-level drive signal and the inverted second 2-level drive signal to generate a 3-level RZ drive signal, wherein each occurrence of a binary state in the differentially encoded data signal is represented in the 3-level RZ drive signal by a positive pulse or a negative pulse relative to a reference level; and
- a modulator coupled to the third differential amplifier such that the 3-level RZ drive signal drives the modulator to generate RZ-DPSK optical signals.

22. The apparatus of claim 21, wherein said reference level is a level of the RZ drive signal at which the modulator outputs substantially no light.

23. An apparatus for generating a return-to-zero (RZ) M-ary differential-phase-amplitude-shift-keyed (M-ary DP-ASK) optical signal, comprising:
- means for generating an M-level RZ drive signal and for driving a single modulator with the drive signal, wherein M is an integer greater than three and the modulator is adapted to modulate both intensity and phase of an optical beam to generate the RZ M-ary DP-ASK optical signal, wherein the means for generating comprises:
  - a first plurality of logic AND gates, each adapted to perform a logic AND operation on a respective signal of a plurality of differentially encoded data signals and a clock signal to generate a plurality of first 2-level drive signals,
  - a second plurality of logic AND gates, each adapted to perform a logic AND operation on an inverse of the plurality of differentially encoded data signals and the clock signal to generate a plurality of second 2-level drive signals,
  - a plurality of power combiners, each adapted to power combine a corresponding one of the first 2-level drive signals with an inverse of the corresponding second 2-level drive signal to generate a corresponding one of a plurality of 3-level RZ drive signals; and
  - an additional power combiner adapted to power combine the plurality of 3-level RZ drive signals to generate the M-level RZ drive signal.

24. The apparatus of claim 23, further comprising the modulator, wherein the modulator is a Mach-Zehnder modulator.

25. A method of generating a return-to-zero (RZ) M-ary differential-phase amplitude-shift-keyed (DP-ASK) optical signal, comprising the steps of:
- generating a multi-level RZ drive signal; and
- driving a modulator with the drive signal to generate the RZ M-ary DP-ASK optical signal, wherein the step of generating the multi-level RZ drive signal further includes the steps of:
  - performing a logic AND operation on a plurality of differentially encoded data signals and a clock signal to generate a plurality of first 2-level drive signals,
  - performing a logic AND operation on each of an inverse of the plurality of differentially encoded data signals, and the clock signal to generate a plurality of respective second 2-level drive signal,
  - power combining each of the plurality of first 2-level drive signals with a respective inverse of the plurality of respective second 2-level drive signals to generate a plurality of 3-level RZ drive signals; and
  - power combining the plurality of 3-level RZ drive signals to generate the multi-level RZ drive signal.

* * * * *